United States Patent [19]
Uematsu

[11] Patent Number: 5,899,289
[45] Date of Patent: May 4, 1999

[54] AUTOMATICALLY DRIVEN MOTOR VEHICLE

[75] Inventor: Isao Uematsu, Wako, Japan

[73] Assignee: Honda Giken Kogyo Kabushiki Kaisha, Tokyo, Japan

[21] Appl. No.: 08/741,187

[22] Filed: Oct. 29, 1996

[30] Foreign Application Priority Data

Oct. 31, 1995 [JP] Japan .................................... 7-283975

[51] Int. Cl.⁶ ....................................................... B60T 7/16
[52] U.S. Cl. .......................................... 180/168; 180/169
[58] Field of Search ...................................... 180/167, 168, 180/169; 318/587

[56] References Cited

U.S. PATENT DOCUMENTS

| | | | |
|---|---|---|---|
| 3,835,950 | 9/1974 | Asano et al. | 180/167 |
| 5,495,251 | 2/1996 | Gilling et al. | 180/167 X |
| 5,521,579 | 5/1996 | Bernhard | 180/167 X |

*Primary Examiner*—Richard M. Camby
*Assistant Examiner*—William R. Zimonerl
*Attorney, Agent, or Firm*—Lyon & Lyon LLP

[57] ABSTRACT

An automatically driven motor vehicle automatically follows a front motor vehicle while controlling an intervehicular distance up to the front motor vehicle. A speed of the following motor vehicle, and a speed of the front motor vehicle are recognized. The difference between the speed of the following motor vehicle and the speed of the front motor vehicle is compared with a predetermined value, and acceleration/deceleration correcting data to adjust an intervehicular distance between the following motor vehicle and the front motor vehicle are adjusted depending on the speed of the following motor vehicle or the speed of the front motor vehicle based on a result of comparison. The acceleration/deceleration correcting data are generated based on the speed of the front motor vehicle if the difference is smaller than the predetermined value, and the acceleration/deceleration correcting data are generated based on the speed of the following motor vehicle if the difference is greater than the predetermined value. Acceleration and deceleration of the following motor vehicle are controlled depending on the acceleration/deceleration correcting data.

11 Claims, 4 Drawing Sheets

AUTOMATICALLY DRIVEN MOTOR VEHICLE

BACKGROUND OF THE INVENTION

1. Field of the Invention

The present invention relates to an automatically driven motor vehicle, and more particularly to an automatically driven motor vehicle capable of automatically running behind a front motor vehicle while controlling the distance between itself and the front motor vehicle.

2. Description of the Prior Art

Research efforts are being made to develop a technology for automatically driving motor vehicles such as automobiles on roads while detecting obstacles with a radar, a CCD camera, or their combination to recognize front obstacles and road conditions. However, there has not been available any technology, to be incorporated into automatically driven motor vehicles, for appropriately recognizing front obstacles and road conditions on any roads.

Automatic vehicle travel control under given conditions has already been practiced in limited applications such as automatic transport carriage control in factories, for example. Such an automatic transport carriage is controlled to travel at a low speed along a predetermined path based on the detection of magnetic markers that are arranged at given intervals along the path.

However, it is difficult to control the automatic transport carriage to run accurately on the predetermined path, and the actual position where the automatic transport carriage runs tends to be displaced in error from the predetermined path while the automatic transport carriage is running.

It has been customary to control the automatic transport carriage to run along the predetermined path by detecting a displacement error between the present position of the automatic transport carriage and the predetermined path and eliminating the displacement error under feedback control.

The conventional automatic transport carriage control process has been unstable because of hunting in eliminating displacement errors particularly when the automatic transport carriage runs at high speeds. It has been difficult to run the automatic transport carriage on general roads while controlling its speed.

There has been proposed an automatically driven motor vehicle which automatically follows a front motor vehicle by detecting the front motor vehicle and controlling the distance (intervehicular distance) between itself and the front motor vehicle with a function that is proportional to the speed of the front motor vehicle.

For example, as shown in FIG. 4(a) of the accompanying drawings, when a speed v of a front motor vehicle is detected at the time the front motor vehicle starts to move, an intervehicular distance L which is proportional to the speed V of the front motor vehicle is calculated according to the equation given belay and outputted as a command signal for the intervehicular distance L between the automatically driven motor vehicle and the front motor vehicle:

$$L = s \cdot V$$

where s is a coefficient expressed in time.

An acceleration or deceleration for the automatically driven motor vehicle (the following motor vehicle) to keep the intervehicular distance L is determined, and the speed of the automatically driven motor vehicle is controlled according to the determined acceleration or deceleration.

After the acceleration of the automatically driven motor vehicle is finished and the front motor vehicle runs at a constant speed, the automatically driven motor vehicle runs at the same speed as the speed of the front motor vehicle while keeping an intervehicular distance corresponding to its speed.

If the front motor vehicle is abruptly decelerated or a motor vehicle which happens to be stopping due to a traffic jam or a breakdown is recognized as the front motor vehicle, then the command signal for the intervehicular distance is abruptly reduced. Therefore, the automatically driven motor vehicle (the following motor vehicle) controls its speed to abruptly reduce the intervehicular distance between itself and the front motor vehicle.

As a consequence, the following motor vehicle is decelerated at a ratio smaller than the front motor vehicle, and runs abruptly close to the front motor vehicle.

As shown in FIG. 4(b) of the accompanying drawings, such a drawback can be eliminated by producing command signals for intervehicular distances Ls, Le (>0), as indicated below, when the speed V is zero (V=0) at the time the following motor vehicle starts to move, i.e., starts to be accelerated, and comes to a stop, i.e., is decelerated, respectively.

$$L = Ls + s \cdot V \text{ (when the motor vehicle starts to move),}$$

$$L = Le + s \cdot V \text{ (when the motor vehicle comes to a stop)}$$

Because the command signal for the intervehicular distance L is always larger than Ls or Le, the automatically driven motor vehicle is prevented from getting too close to the front motor vehicle even when the front motor vehicle is abruptly decelerated.

However, the above proposal suffers its own drawback. Since the intervehicular distance L represented by the above equations is present between the front motor vehicle and the following motor vehicle when the speed is of a certain value, the intervehicular distance L includes an extra distance equal to Ls or Le and hence is unnecessarily greater than actually required.

As represented by the above equations, the intervehicular distances Ls, Le at the time the speed V is nil are different from each other when the following motor vehicle starts to move and comes to a stop, respectively, and the command signals are determined by respective different functions. Consequently, while the motor vehicle is running at a certain speed Vc (see FIG. 4(b)), for example, the functions representing the respective command signals need to be switched over. As a result, the actual command signal tends to change discontinuously from one level to another, causing the speed V to change abruptly.

SUMMARY OF THE INVENTION

It is therefore an object of the present invention to provide an automatically driven motor vehicle which is capable of automatically running stably behind a front motor vehicle while keeping an appropriate intervehicular distance between itself and the front motor vehicle on a road under certain conditions, e.g., a motor highway with arrays of magnetic information sources installed in respective lanes.

Another object of the present invention is to provide an automatically driven motor vehicle which is capable of smoothly controlling an intervehicular distance between itself and a front motor vehicle running forward thereof when the automatically driven motor vehicle starts to move, is accelerated and decelerated, and comes to a stop.

To achieve the above objects, there is provided in accordance with a first aspect of the present invention an automatically driven motor vehicle (the following motor vehicle) for automatically following a front motor vehicle while controlling an intervehicular distance up to the front motor vehicle, comprising first means for recognizing a speed of the following motor vehicle, second means for recognizing a speed of the front motor vehicle, third means for comparing the difference between the speed of the following motor vehicle and the speed of the front motor vehicle with a predetermined value, and adjusting acceleration/deceleration correcting data to adjust an intervehicular distance between the following motor vehicle and the front motor vehicle depending on the speed of the following motor vehicle or the speed of the front motor vehicle based on a result of comparison, the third means comprising means for generating the acceleration/deceleration correcting data based on the speed of the front motor vehicle if the difference is smaller than the predetermined value, and generating the acceleration/deceleration correcting data based on the speed of the following motor vehicle if the difference is greater than the predetermined value, and control means for controlling acceleration and deceleration of the following motor vehicle depending on the acceleration/deceleration correcting data.

If the difference between the speed of the following motor vehicle and the speed of the front motor vehicle is less than the predetermined value, then acceleration/deceleration correcting data to adjust an intervehicular distance between the following motor vehicle and the front motor vehicle are generated depending on the speed of the front motor vehicle. The acceleration/deceleration of the following motor vehicle are controlled by the control means depending on the acceleration/deceleration correcting data. Therefore, when the following motor vehicle and the front motor vehicle are running at substantially the same speed under normal conditions, the speed of the following motor vehicle is controlled to keep an intervehicular distance that matches the speed of the motor vehicles.

If the difference between the speed of the following motor vehicle and the speed of the front motor vehicle is greater than the predetermined value, then acceleration/deceleration correcting data to adjust an intervehicular distance between the following motor vehicle and the front motor vehicle are generated depending on the speed of the following motor vehicle. The acceleration/deceleration of the following motor vehicle are controlled by the control means depending on the acceleration/deceleration correcting data. Stated otherwise, the acceleration/deceleration of the following motor vehicle are controlled to adjust the intervehicular distance up to the front motor vehicle. Therefore, when the front motor vehicle starts to move and is accelerated from stopped conditions of the following motor vehicle and the front motor vehicle, and the speed difference between the speed of the following motor vehicle and the speed of the front motor vehicle increases, since the speed of the following motor vehicle is low, the motor vehicle following motor vehicle is started and accelerated to adjust the intervehicular distance therebetween to a small value depending on the low speed of the following motor vehicle. Consequently, the motor vehicle following motor vehicle smoothly follows the front motor vehicle.

As the speed difference increases when the front motor vehicle is decelerated to a stop while the front and following motor vehicles are running under steady conditions, since the speed of the following motor vehicle is high, the following motor vehicle is decelerated to adjust the intervehicular distance to a large value depending on the high speed of the following motor vehicle. Therefore, the following motor vehicle is decelerated at a deceleration ratio depending on the deceleration of the front motor vehicle, and is prevented from getting too close quickly to the front motor vehicle.

According to the first aspect of the present invention, therefore, the following motor vehicle is automatically driven to follow the front motor vehicle stably while keeping an appropriate intervehicular distance up to the front motor vehicle.

The third means comprises fourth means for recognizing an intervehicular distance between the following motor vehicle and the front motor vehicle, fifth means for generating command data for an intervehicular distance between the following motor vehicle and the front motor vehicle depending on the speed of the following motor vehicle or the speed of the front motor vehicle based on the result of comparison, the fifth means comprising means for generating command data for an intervehicular distance depending on the speed of the front motor vehicle if the difference is less than the predetermined value, and generating command data for an intervehicular distance depending on the speed of the following motor vehicle if the difference is greater than the predetermined value, and sixth means for generating the acceleration/deceleration correcting data depending on a deviation between the recognized intervehicular distance and the command data.

With the above arrangement, since the acceleration/deceleration correcting data to adjust the intervehicular distance between the following motor vehicle and the front motor vehicle are generated depending on a deviation between the recognized intervehicular distance and the command data for the intervehicular distance, the acceleration/deceleration of the following motor vehicle is controlled to equalize the actual intervehicular distance with the command data. At this time, the command data for the intervehicular distance are generated depending on the speed of the front motor vehicle if the speed difference between the following motor vehicle and the front motor vehicle is less than the predetermined value, and are generated depending on the speed of the following motor vehicle if the speed difference is greater than the predetermined value. Therefore, the following motor vehicle is controlled to follow the front motor vehicle as described above.

An appropriate intervehicular distance can reliably be maintained between the following motor vehicle and the front motor vehicle by controlling the acceleration/deceleration of the following motor vehicle depending on the deviation between the recognized intervehicular distance and the command data for the intervehicular distance which are generated depending on the speed of the following motor vehicle or the speed of the front motor vehicle.

According to a second aspect of the present invention, there is provided an automatically driven motor vehicle (the following motor vehicle) for automatically following a front motor vehicle while controlling an intervehicular distance up to the front motor vehicle, comprising first means for recognizing present running states of the following motor vehicle which include at least a speed and an acceleration thereof, second means for recognizing present running states of the front motor vehicle which include at least a position of the front motor vehicle with respect to the following motor vehicle, a speed of the front motor vehicle, and an acceleration of the front motor vehicle, third means for determining a predicted intervehicular distance between the following motor vehicle and the front motor vehicle after a predetermined time based on the present running states of the following motor vehicle and the present running states of the front motor vehicle, fourth means for comparing the difference between the speed of the following motor vehicle and the speed of the front motor vehicle with a predetermined value, and generating command data for an intervehicular distance between the following motor vehicle and the front motor vehicle depending on the speed of the following motor vehicle or the speed of the front motor vehicle based on a result of comparison, the fourth means comprising means for generating command data for an intervehicular distance based on the speed of the front motor vehicle if the difference is smaller than the predetermined value, and generating command data for an intervehicular distance based on the speed of the following motor vehicle if the difference is greater than the predetermined value, fifth means for generating acceleration/deceleration correcting data for the following motor vehicle depending on a deviation between the predicted intervehicular distance and the command data for the intervehicular distance, and control means for controlling acceleration and deceleration of the following motor vehicle depending on the acceleration/deceleration correcting data.

According to the second aspect of the present invention, a predicted intervehicular distance, i.e., a predicted value of the intervehicular distance, between the following motor vehicle and the front motor vehicle after the predetermined time is determined based on the present running states of the following motor vehicle (including the speed and acceleration of the following motor vehicle) and the present running states of the front motor vehicle (including the position of the front motor vehicle with respect to the following motor vehicle, the speed of the front motor vehicle, and the acceleration of the front motor vehicle). Since the present running states of the following motor vehicle include the speed and the acceleration of the following motor vehicle, the position where the following motor vehicle runs after the predetermined time can be predicted from the present position of the following motor vehicle based on those data. Since the present running states of the front motor vehicle include the position of the front motor vehicle with respect to the motor vehicle following, the speed of the front motor vehicle, and the acceleration of the front motor vehicle, the position where the front motor vehicle runs after the predetermined time can be predicted from the present position of the front motor vehicle with respect to the following motor vehicle based on those data. Therefore, the predicted intervehicular distance between the following motor vehicle and the front motor vehicle after the predetermined time is determined.

According to the second aspect, as with the first aspect, command data for an intervehicular distance are generated depending on the speed of the following motor vehicle or the speed of the front motor vehicle based on the comparison of the speed difference between the following motor vehicle and the front motor vehicle with the predetermined value, and acceleration/deceleration correcting data to adjust the intervehicular distance are generated depending on a deviation between the command data and the predicted intervehicular distance. The acceleration/deceleration of the following motor vehicle is controlled depending on the acceleration/deceleration correcting data.

Consequently, the acceleration/deceleration of the following motor vehicle is controlled such that a future intervehicular distance after the predetermined time is equalized with the command data for the intervehicular distance depending on the speed of the following motor vehicle or the speed of the front motor vehicle.

Therefore, the following motor vehicle is reliably and smoothly operated to follow the front motor vehicle while maintaining a suitable intervehicular distance up to the front motor vehicle without suffering a delay in the control of its acceleration/deceleration.

In each of the first and second aspects, the command data for the intervehicular distance comprise data having a magnitude proportional to the magnitude of the speed of the following motor vehicle or the speed of the front motor vehicle. Irrespective whether the intervehicular distance is to be adjusted depending on the speed of the front motor vehicle or the speed of the following motor vehicle, command data for an intervehicular distance are generated in proportion to the magnitude of the speed of the following motor vehicle or the speed of the front motor vehicle, resulting in an appropriate intervehicular distance between these motor vehicles.

In the first aspect, the automatically driven motor vehicle (the following motor vehicle) further comprises means for generating second acceleration/deceleration correcting data for the following motor vehicle depending on the difference between the speed of the following motor vehicle and the speed of the front motor vehicle, the control means comprising means for controlling the acceleration/deceleration of the following motor vehicle depending on the acceleration/deceleration correcting data and the second acceleration/deceleration correcting data. Similarly, in the second aspect, the automatically driven motor vehicle (the following motor vehicle) further comprises means for determining a predicted intervehicular speed difference between the following motor vehicle and the front motor vehicle after a predetermined time based on the present running states of the following motor vehicle and the present running states of the front motor vehicle, and means for generating second acceleration/deceleration correcting data for the following motor vehicle depending on the predicted intervehicular speed difference, the control means comprising means for controlling acceleration and deceleration of the following motor vehicle depending on the acceleration/deceleration correcting data and the second acceleration/deceleration correcting data.

As described above, in addition to the control of the acceleration and deceleration depending on the acceleration/deceleration correcting data, the second acceleration/deceleration correcting data are generated depending on the speed difference between the following motor vehicle and the front motor vehicle (in the second aspect, the predicted intervehicular speed difference after the predetermined time), and the acceleration and deceleration of the following motor vehicle are controlled depending on the second acceleration/deceleration correcting data. Thus, as the speed difference between the following motor vehicle and the front motor vehicle is greater, the acceleration and deceleration of the following motor vehicle are increased or reduced to follow the front motor vehicle more quickly. Therefore, the following motor vehicle can quickly follow the front motor vehicle.

In the second aspect of the present invention, since the second acceleration/deceleration correcting data are generated depending on a future speed difference after the predetermined time, i.e., the predicted intervehicular speed difference, the following motor vehicle can more quickly follow the front motor vehicle.

According to the first aspect of the present invention, the automatically driven motor vehicle further comprises intervehicular communication means for transmitting and receiving information indicative of speeds of the following motor vehicle and the front motor vehicle between at least the following motor vehicle and the front motor vehicle, the second means comprising means for recognizing the speed of the front motor vehicle based on the information received from the front motor vehicle by the intervehicular communication means. Likewise, according to the second aspect of the present invention, the automatically driven motor vehicle (the following motor vehicle) further comprises intervehicular communication means for transmitting and receiving information indicative of the present running states between at least the following motor vehicle and the front motor vehicle, the second means comprising means for recognizing the present running states based on the information received from the front motor vehicle by the intervehicular communication means.

Because the information indicative of the running states including the speeds of the motor vehicles is transmitted and received through intervehicular communications, the following motor vehicle can easily recognize the running states of the front motor vehicle such as the speed thereof.

The running states of the front motor vehicle such as the speed thereof may be detected through a radar or the like.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 2:
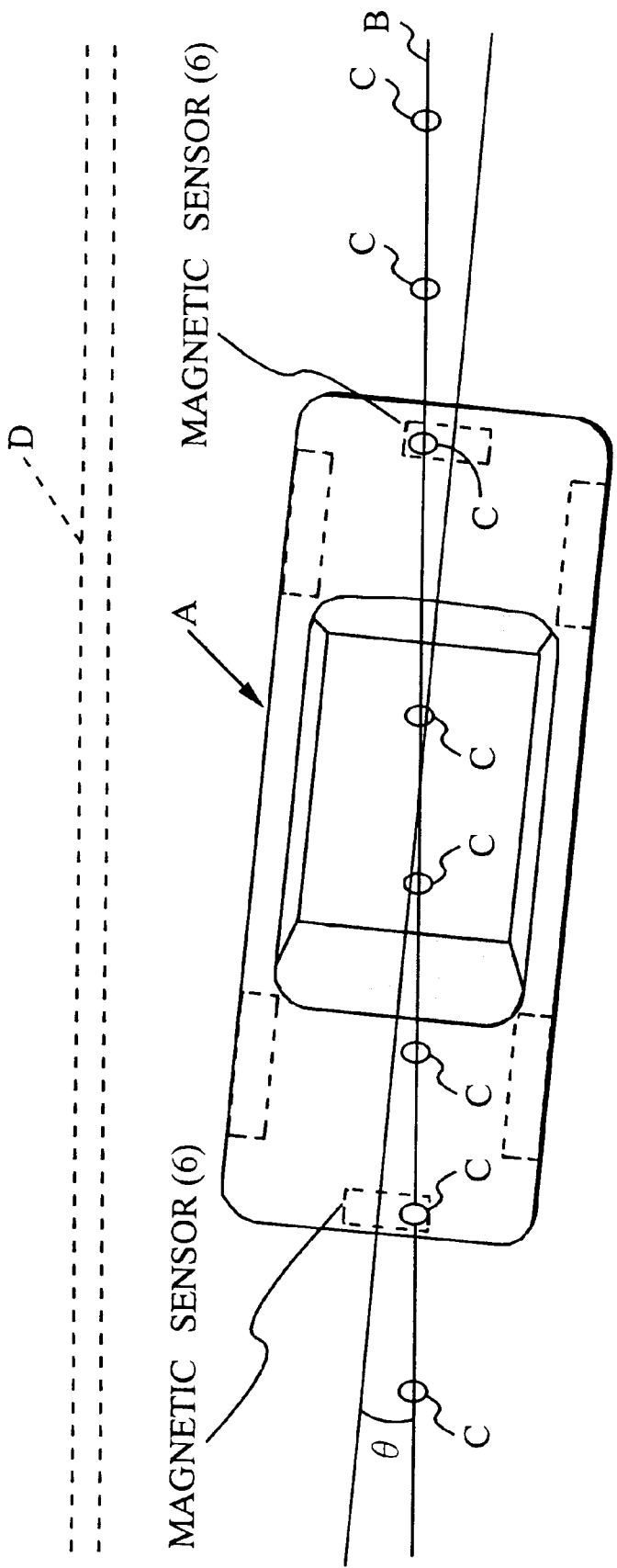
FIG. 2 is a schematic view illustrative of the manner in which each of the automatically driven motor vehicles shown in FIG. 1 magnetically senses magnetic information sources.

As shown in FIG. 2, an automatically driven motor vehicle A according to the present invention automatically runs along a running path B at the center of an automatic running road while detecting magnetic information sources (magnetic nails or markers) C which are embedded in the road at given intervals of 1 m, for example. If there is another motor vehicle (not shown in FIG. 2) running forward of the motor vehicle A, then the motor vehicle A keeps a given intervehicular distance between itself and the front motor vehicle while running behind the front motor vehicle. An LCX (leakage coaxial) cable D is installed on and along the road for transmitting information to and receiving information from the motor vehicle A. Furthermore, information representing running conditions of front and following motor vehicles is also transmitted between these front and following motor vehicles.

Figure 1:
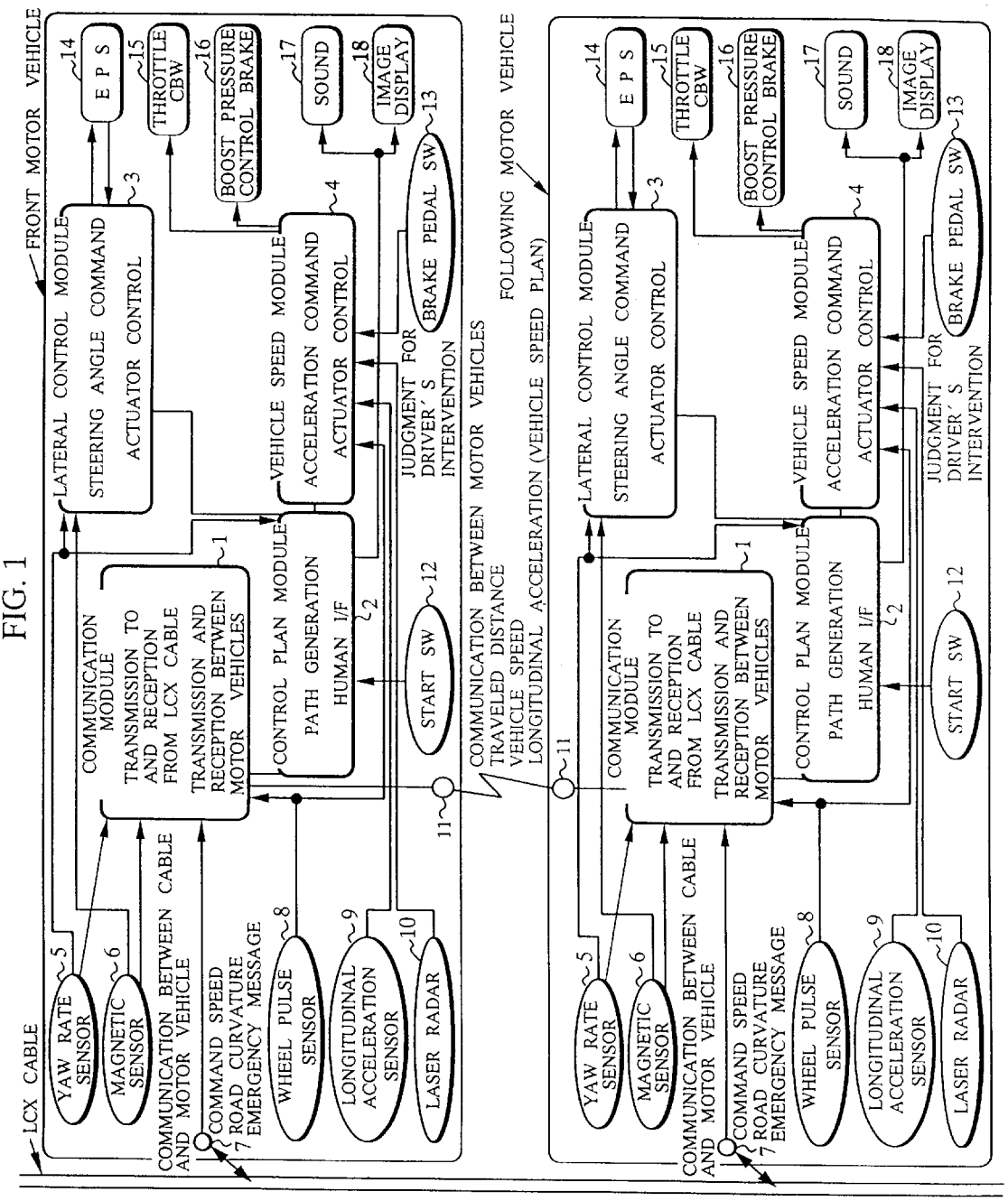
FIG. 1 is a block diagram of a system for controlling an automatically driven motor vehicle to follow another automatically driven motor vehicle according to the present invention.

A system of controlling an automatically driven motor vehicle to follow another automatically driven motor vehicle according to the present invention is shown in FIG. 1.

FIG. 1 shows two automatically driven motor vehicles, one running forward of the other along a predetermined path. Since these two automatically driven motor vehicles are identical to each other, only one of them will be described below in detail.

As shown in FIG. 1, the motor vehicle has a communication signal processor 1, a control plan processor 2, a lateral (steering) vehicle controller 3, and a vehicle speed controller 4. Each of these processors and controllers comprises a module having a central processing unit (CPU). The motor vehicle also has a yaw rate sensor 5 for detecting an angular velocity of the motor vehicle in a lateral or steering direction thereof, two magnetic sensors 6 for detecting the magnetic information sources C, a wheel pulse sensor 8 for outputting a pulse each time the wheels of the motor vehicle make one revolution, i.e., per distance traversed by the motor vehicle when the wheels make one revolution, a longitudinal acceleration sensor 9 for detecting an acceleration of the motor vehicle in a longitudinal direction of the motor vehicle, and a laser radar 10 for detecting a front motor vehicle or a front obstacle and also detecting the distance up to such a front motor vehicle or a front obstacle. Data detected by the yaw rate sensor 5, the magnetic sensors 6, the wheel pulse sensor 8, the longitudinal acceleration sensor 9, and the laser radar 10 are supplied to the processors 1, 2 and controllers 3, 4.

As shown in FIG. 2, the magnetic sensors 6 are disposed respectively beneath front and rear bumpers of the motor vehicle. Each of the magnetic sensors 6 detects not only the magnetic information source C positioned therebelow, but also the lateral position of the magnetic sensor 6, i.e., its position in lateral directions of the motor vehicle, with respect to the magnetic information source C within a range of 45 cm on each lateral side of the center of the magnetic information source C, as the lateral position of one of the front and rear ends of the motor vehicle with respect to the magnetic information source C.

When supplied with detected data from the sensors 5, 6, 8, 9 and the laser radar 10, the processors 1, 2 and controllers 3, 4 operate as follows:

The communication signal processor 1 functions as communication means for effecting communication with the LCX cable D, and also with the other motor vehicle through its own communication devices 7, 11 which each comprise an antenna and a transmitter/receiver.

Specifically, the communication signal processor 1 receives from the LCX cable D various items of information including information as to a speed command for the motor vehicle in an area in which it is running, information as to the curvature of the road lying ahead of the motor vehicle, information as to traffic jams, and information as to emergency messages. The communication signal processor 1 supplies the received items of information to the control plan processor 2. The communication signal processor 1 transmits the ID number of its own motor vehicle to the LCX cable D. Based on the received ID number, a central control system connected to the LCX cable D can recognize the present position where the motor vehicle is running.

The communication signal processor 1 also transmits to and receives from the other motor vehicle, various items of information including information as to the position where the motor vehicle is running, i.e., the distance which the motor vehicle has traveled, on the running path B from time to time, which position or distance is recognized in a manner described later on, information as to the speed of the motor vehicle, information as to the longitudinal acceleration of the motor vehicle, and information as to a speed plan of the motor vehicle. The communication signal processor 1 supplies the received items of information to the control plan processor 2. The communication signal processor 1 on the following motor vehicle which runs behind the front motor vehicle serves as means for recognizing running conditions such as the speed, the acceleration, etc. of the front motor vehicle.

The communication signal processor 1 also serves as running position recognizing means for recognizing the position where the motor vehicle is running on the running path B.

According to this embodiment, the position where the motor vehicle is running is recognized as follows: Since the automatically driven motor vehicle basically runs on the running path B on which the magnetic information sources C are arrayed, the distance that the motor vehicle has traveled on the running path B represents the position where the motor vehicle runs on the running path B. After the motor vehicle has started to run on the running path B, the communication signal processor 1 counts the number of times that the magnetic information sources C are detected by the magnetic sensors 6, multiplies the counted number of times by the constant distance between the magnetic information sources C to determine a distance, and recognizes the determined distance as the distance that the motor vehicle has traveled on the running path B. If the motor vehicle deviates from the running path B, failing to detect the magnetic information sources C, then the communication signal processor 1 recognizes the distance that the motor vehicle has traveled on the running path B, based on an output signal from the wheel pulse sensor 8. Based on the recognized distance, the communication signal processor 1 recognizes the position where the motor vehicle is running on map data, which are carried by the motor vehicle, of the running path B, and gives the recognized position to the control plan processor 2. The map data of the running path B are represented as data of the array of magnetic information sources C, and may be stored in a storage medium that is carried on the motor vehicle or may be received from an external source in every given running zone through communication with the LCX cable D or the like.

In this embodiment, the magnetic information sources C on the running path B contain bit information whose magnetic polarity is reversed at intervals of 500 m, for example. Each time the bit information is detected by the magnetic sensors 6, the distance which the motor vehicle has traveled is corrected according to the intervals of 500 m, e.g., it is corrected into an integral multiple of 500 m.

An automatic driving start switch 12 is connected to the control plan processor 2. When the automatic driving start switch 12 is turned on, the control plan processor 2 starts generating information for automatically driving the motor vehicle.

The control plan processor 2 has a function as speed plan generating means for generating a speed plan which governs the relationship between the position in which the motor vehicle runs and the speed at which the motor vehicle runs on the running path B, based on speed command information in the area in which the motor vehicle is running, given from the LCX cable D through the communication signal processor 1. The control plan processor 2 produces a speed plan according to the speed command supplied from the LCX cable D. For example, when the control plan processor 2 is supplied with a speed command of 80 km/h in a certain running area, if the present speed of the motor vehicle is 78 km/h, then the control plan processor 2 generates a speed plan for increasing the speed of the motor vehicle up to 80 km/h at an acceleration of 2 km/h/min., for example, and then maintaining the speed of 80 km/h.

The control plan processor 2 also has a function as planned value determining means for determining, based on the speed plan thus generated, a planned position to be reached from the present position of the motor vehicle after a predetermined time T, e.g., 1.5 seconds, and a planned speed of the motor vehicle at the planned position. According to this function, if the speed plan from the present position of the motor vehicle is generated such that the motor vehicle is to maintain the speed of 80 km/h, i.e., 22.2 m/sec., then the planned position to be reached after the predetermined time T, e.g., 1.5 seconds is 33.3 m spaced from the present position down the running path B, and the planned speed at the planned position to be reached is 80 km/h.

The control plan processor 2 further has functions as predicted value calculating means, deviation calculating means, and speed plan acceleration/deceleration data calculating means, as described below. The control plan processor 2 on the following motor vehicle which runs behind the front motor vehicle also has functions as front motor vehicle predicted value calculating means, predicted intervehicular distance calculating means, intervehicular speed difference calculating means, and intervehicular control acceleration/deceleration data calculating means, as described below.

The function as the predicted value calculating means serves to determine a predicted position and a predicted speed to be reached by the following motor vehicle after the predetermined time T. The predicted position is determined according to a calculation, described below, from the present position, i.e., the traveled distance, the present speed, and the present acceleration of the following motor vehicle which are given from the communication signal processor 1, and the predicted speed is determined according to a calculation, described below, from the present speed and the present acceleration of the following motor vehicle.

The speed of the following motor vehicle, based on which the predicted position and the predicted speed will be determined, is basically determined from a latest first-order differential of the position where the following motor vehicle runs, which is given, from time to time, from the communication signal processor 1, i.e., from a change in the position where the following motor vehicle runs per unit time. Similarly, the acceleration of the following motor vehicle is basically determined from a latest second-order differential of the position where the following motor vehicle runs, i.e., from a rate of change in the position where the following motor vehicle runs per unit time. The predicted position and the predicted speed are determined using the speed and the acceleration of the following motor vehicle which are thus determined. This provides means for recognizing the speed and the acceleration of the following motor vehicle. However, if the following motor vehicle deviates from the running path B and the position where the motor vehicle runs cannot properly be recognized, then the predicted position and the predicted speed are determined using a speed detected from a change per unit time in the traveled distance recognized from an output signal from the wheel pulse sensor 8, and an acceleration detected by the longitudinal acceleration sensor 9. The speed of the following motor vehicle may be detected by a speed sensor.

The function as the deviation calculating means serves to determine a distance deviation, i.e., a position error, between a planned position to be reached by the following motor vehicle after the predetermined time T based on the speed plan and the predicted position, described above, to be reached by the following motor vehicle, and also determines a speed deviation, i.e., a speed error, between a planned speed to be reached by the following motor vehicle after the predetermined time T based on the speed plan and the predicted speed, described above, to be reached by the following motor vehicle. These deviations are calculated by subtractions.

The function as the speed plan acceleration/deceleration data calculating means serves to generate acceleration/deceleration correcting data for the speed plan, i.e., a control quantity for correcting the acceleration or deceleration of the following motor vehicle, based on the distance deviation and the speed deviation described above. In this embodiment, the acceleration/deceleration correcting data for the speed plan are generated by multiplying the distance deviation and the speed deviation by respective predetermined gain coefficients, thus producing product values, and then adding the product values to each other.

The function as the front motor vehicle predicted value calculating means on the following motor vehicle serves to determine a predicted position and a predicted speed to be reached by the front motor vehicle after the predetermined time T. The predicted position of the front motor vehicle is determined according to a calculation, described below, from the present position, i.e., the traveled distance, the present speed, and the present acceleration of the front motor vehicle which are recognized by the communication signal processor 1 through communications between the front and following motor vehicles, and the predicted speed of the front motor vehicle is determined according to a calculation, described below, from the present speed and the present acceleration of the front motor vehicle. The present speed and the present acceleration of the front motor vehicle may be determined by first- and second-order differentials of the position where the front motor vehicle runs, from the data of the position where the front motor vehicle runs, which is given through communications between the front and following motor vehicles.

The function as the predicted intervehicular distance calculating means on the following motor vehicle serves to determine an intervehicular distance between the following vehicle and the front motor vehicle, which is predicted after the predetermined time T. The intervehicular distance after the predetermined time T is determined by calculating a distance difference between the predicted position, determined as described above, to be reached by the front motor vehicle and the predicted position, determined as described above, to be reached by the following motor vehicle.

The function as the intervehicular speed difference calculating means on the following motor vehicle serves to determine a speed difference between the following motor vehicle and the front motor vehicle, which is predicted after the predetermined time T. The intervehicular speed difference after the predetermined time T is determined by calculating a difference between the predicted speed of the front vehicle and the predicted speed of the following motor vehicle.

The function as the intervehicular control acceleration/deceleration data calculating means on the following motor vehicle serves to generate acceleration/deceleration correcting data for intervehicular control, i.e., a control quantity for correcting the acceleration or deceleration of the following motor vehicle, based on the predicted intervehicular distance and the intervehicular speed difference described above. In this embodiment, the acceleration/deceleration correcting data for intervehicular control are generated by multiplying a deviation between the predicted intervehicular distance and a target intervehicular distance, described later on, of the following motor vehicle or the front motor vehicle by a predetermined gain coefficient, thus producing a product value (corresponding to acceleration/deceleration correcting data according to the present invention), multiplying the intervehicular speed difference by a predetermined gain coefficient, thus producing a product value (corresponding to second acceleration/deceleration correcting data according to the present invention), and adding the produced product values to each other.

The control plan processor 2 which has the above functions also serves to determine a present lateral positional deviation of the following motor vehicle from the running path B, i.e., the array of magnetic information sources C, and a directional deviation, i.e., an angle θ (see FIG. 2) formed between the following motor vehicle and the running path B, based on output signals from the two magnetic sensors 6 which represent lateral positional data of the magnetic sensors 6 with respect to the running path B. The control plan processor 2 also predicts a lateral positional deviation and a directional deviation of the following motor vehicle from the running path B after the predetermined time T, based on the present speed and steering quantity of the following motor vehicle and curvature information of the road which is given from the LCX cable D. These data are used for steering control to run the following motor vehicle along the running path B.

Furthermore, the control plan processor 2 on the following motor vehicle outputs, to an image display unit 18 and a sound output unit 17, various data including the speed of the following motor vehicle, the speed of the front motor vehicle, the distance up to the front motor vehicle, the configuration of the road ahead of the following motor vehicle, the configuration of the lane ahead of the following motor vehicle, etc.

If the motor vehicle is running as a front motor vehicle, (i.e. ahead of a following motor vehicle) ahead of another motor vehicle, then its control plan processor 2 outputs, to the image display unit 18 and the sound output unit 17, various data including the speed of the front motor vehicle, the speed of the following motor vehicle, the distance back to the following motor vehicle, the configuration of the road ahead of the front motor vehicle, the configuration of the lane ahead of the front motor vehicle, etc.

The data of the distance between the front and following motor vehicles are obtained by the intervehicular communications between the motor vehicles or the laser radar 10, and the data of the configuration of the road ahead of the motor vehicle, the configuration of the lane ahead of the motor vehicle, etc. are obtained by the communications with the LCX cable D.

In this embodiment, the predetermined time T is set to 1.5 seconds. The predetermined time T should preferably be set to a value in the range from 1 to 2 seconds.

The lateral vehicle controller 3 generates a steering angle command signal for moving the motor vehicle along the running path B based on output signals indicative of the lateral positional deviation and the directional deviation, from the control plan processor 2, and outputs the steering angle command signal to control an actuator 14 in a steering operation transmitting system of the motor vehicle.

In response to the command signal, the actuator 14 then automatically steers the motor vehicle to run along the running path B, i.e., the array of magnetic information sources C.

The vehicle speed controller 4 generates an acceleration command signal to control the acceleration or deceleration of the motor vehicle based on the acceleration/deceleration correcting data generated by the control plan processor 2, and outputs the acceleration command signal to control an actuator 15 in a throttle system of the motor vehicle and an actuator 16 in a brake system of the motor vehicle.

In response to the acceleration command signal, the actuators 15, 16 automatically control the throttle and brake systems of the motor vehicle to accelerate or decelerate the motor vehicle.

A brake pedal switch 13 for detecting when a brake pedal (not shown) of the motor vehicle is pressed is connected to the vehicle speed controller 4. If the brake pedal switch 13 detects that the brake pedal is pressed, then the control process of the vehicle speed controller 4 is canceled.

The vehicle speed controller 4 controls braking forces applied to the motor vehicle based on an output signal from the laser radar 10 in the event that the laser radar detects an obstacle other than a front motor vehicle, for example.

Figure 3:
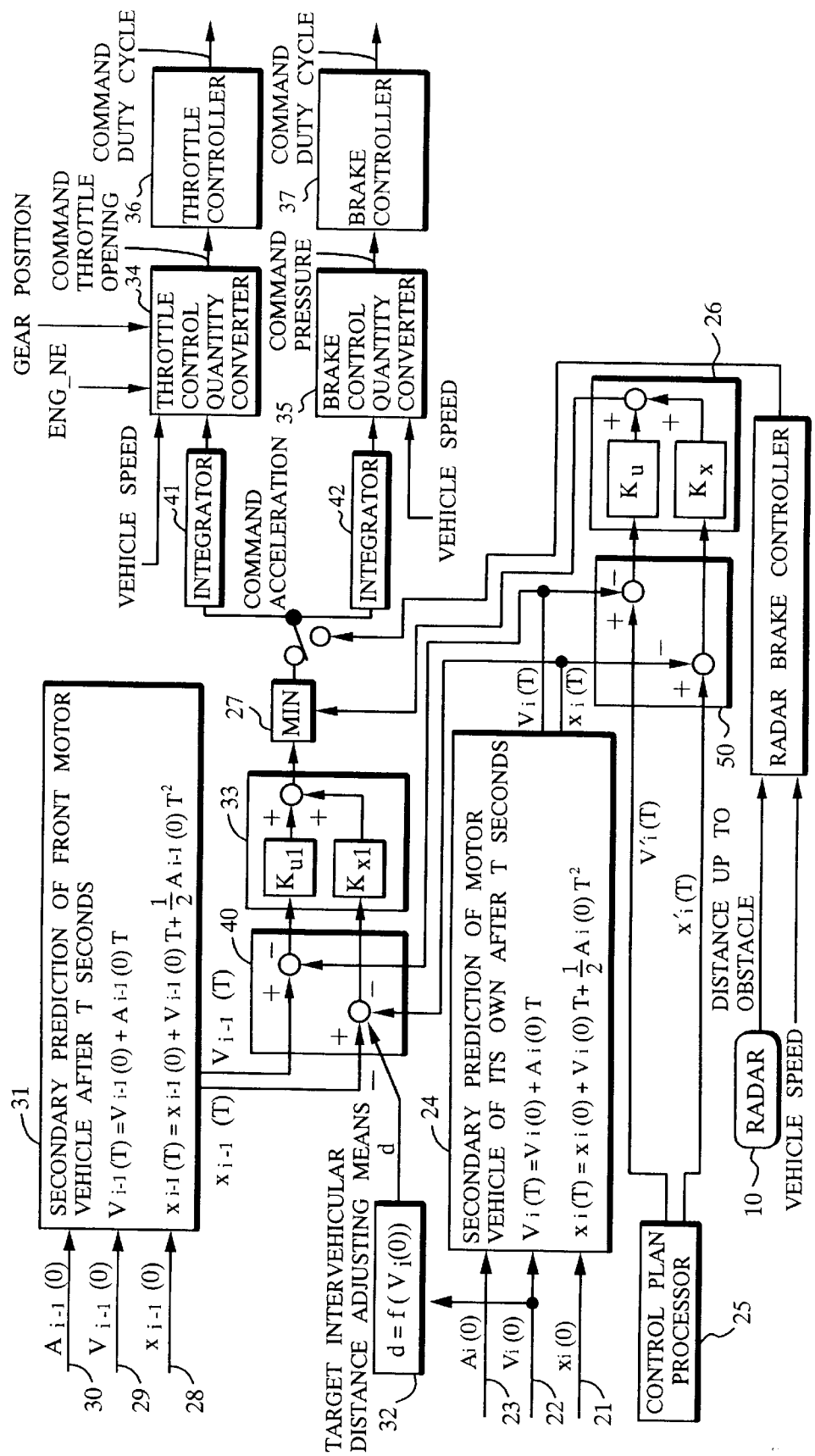
FIG. 3 is a block diagram of an apparatus for controlling the speed of travel of each of the automatically driven motor vehicles shown in FIG. 1.

A vehicle speed control process for controlling the speed of travel of the automatically driven motor vehicle will be described below with reference to FIG. 3.

A position Xi(0) 21 of the motor vehicle, which is determined based on detected signals from the magnetic sensors 6 by the communication signal processor 1, a speed Vi(0) (a first-order differential of the position) 22 of the motor vehicle, which is determined from the position Xi(0) 21 by the control plan processor 2, and an acceleration Ai(0) (a second-order differential of the position) 23 of the motor vehicle are outputted to a processor 24 which predicts a state of the motor vehicle after T seconds in the control plan processor 2.

The processor 24 functions as the predicted value calculating means, and determines a predicted position Xi(T) to be reached after the T seconds and a predicted speed Vi(T) to be reached after the T seconds according to the following respective equations (1), (2):

$$Vi(T) = Vi(0) + Ai(0) \times T \quad (1)$$

$$Xi(T) = Xi(0) + Vi(0) \times T + \tfrac{1}{2} \times Ai(0) \times T^2 \quad (2)$$

A control plan processor 25 of the control plan processor 2, which functions as the speed plan generating means and the planned value determining means, generates a speed plan along the running path B and determines a planned position Xi'(T) and a planed speed Vi'(T) which are to be reached by the motor vehicle after the T seconds, based on a speed command from the LCX cable D.

The predicted position Xi(T) and the predicted speed Vi(T) which are determined by the processor 24, and the planned position Xi'(T) and the planed speed Vi'(T) which are determined by the processor 25 are outputted to a deviation calculator 50 which has a function as the deviation calculating means. The deviation calculator 50 subtracts the predicted position Xi(T) and the predicted speed Vi(T) respectively from the planned position Xi'(T) and the planed speed Vi'(T), thereby producing a distance deviation and a speed deviation after the T seconds. The distance deviation and the speed deviation are outputted to a converter 26 which has a function as the speed plan acceleration/deceleration data calculating means.

The converter 26 generates acceleration/deceleration correcting data by multiplying the distance deviation and the speed deviation by respective predetermined gains Kx, Ku and adding the product values to each other, and outputs the generated acceleration/deceleration correcting data to a comparator 27 in the vehicle speed controller 4.

The above process is carried out in each of the front and following motor vehicles.

In the following motor vehicle, a present position Xi-1(0) 28 where the front motor vehicle runs, a present speed Vi-1(0) 29 of the front motor vehicle, and a present acceleration Ai-1(0) 30 of the front motor vehicle, which are obtained through intervehicular communications with the front motor vehicle, are outputted to a processor 31 which predicts a state of the front motor vehicle after the T seconds in the control plan processor 2 on the following motor vehicle.

The processor 31, which functions as the front motor vehicle predicted value calculating means, determines a predicted position Xi-1(T) to be reached by the front motor vehicle after the T seconds and a predicted speed Vi-1(T) to be reached by the front motor vehicle after the T seconds according to the same equations as the respective equations (1), (2) (see FIG. 3) described above.

The predicted position Xi-1(T) and the predicted speed Vi-1(T) of the front motor vehicle which are determined by the processor 31, and the predicted position Xi(T) and the predicted speed Vi(T) of the following motor vehicle which are determined by the processor 24 are outputted to an intervehicular calculator 40 which functions as the predicted intervehicular distance calculating means and the intervehicular speed difference calculating means. The intervehicular calculator 40 subtracts the predicted position Xi(T) and the predicted speed Vi(T) respectively from the predicted position Xi-1(T) and the predicted speed Vi-1(T), thereby producing a predicted intervehicular distance and an intervehicular speed difference after the T seconds.

The control plan processor 2 also has target intervehicular distance adjusting means 32 for generating command data for an intervehicular distance between the front and following motor vehicles, i.e., data indicative of a target intervehicular distance, depending on the magnitude of the speed difference ($|Vi(0) - Vi-1(0)|$) between the speed Vi(0) 22 of the following motor vehicle and the speed Vi-1(0) 29 of the front motor vehicle.

Figure 4A:
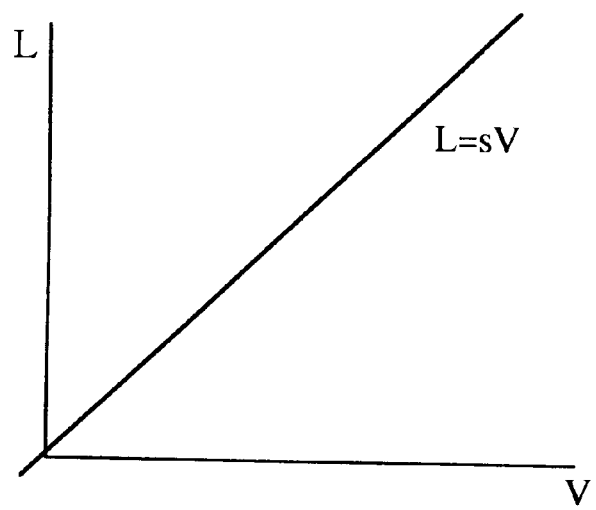
FIG. 4(a) is a diagram showing the correlation between the intervehicular distance and the vehicle speed for producing a conventional intervehicular distance command signal.
Figure 4B:
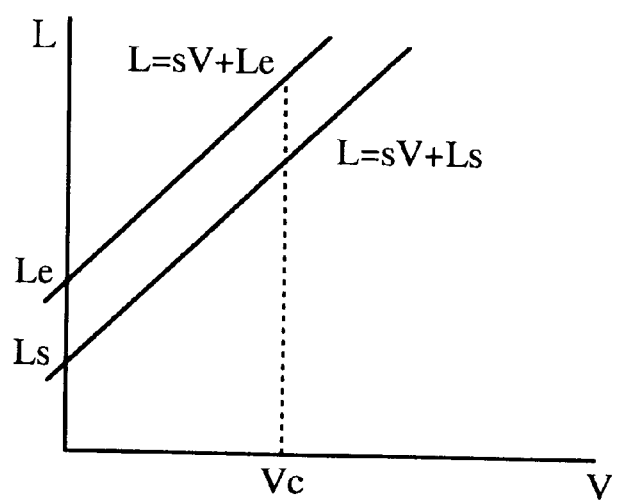
FIG. 4(b) is a diagram showing the correlation between the intervehicular distance and the vehicle speed for producing another conventional intervehicular distance command signal.

The target intervehicular distance adjusting means 32 compares the speed difference ($|Vi(0) - Vi-1(0)|$) between the speed Vi(0) 22 of the following motor vehicle and the speed Vi-1(0) 29 of the front motor vehicle with a predetermined value, i.e., a predetermined speed difference. If the speed difference ($|Vi(0) - Vi-1(0)|$) is of a relatively large value greater than the predetermined value, then the target intervehicular distance adjusting means 32 generates command data for an intervehicular distance proportional to the magnitude of the speed Vi(0) 22 of the following motor vehicle. Conversely, if the speed difference ($|Vi(0 - Vi-1(0)|$) is of a relatively large value smaller than the predetermined value, then the target intervehicular distance adjusting means 32 generates command data for an intervehicular distance proportional to the magnitude of the speed Vi-1(0) 29 of the front motor vehicle. Irrespective whether the command data for an intervehicular distance proportional to the magnitude of the speed Vi(0) 22 of the following motor vehicle or the speed Vi-1(0) 29 of the front motor vehicle are generated, the command data for an intervehicular distance are generated depending on the magnitude of the speed Vi(0) or Vi-1(0) based on a proportionality function shown in FIG. 4(a), for example. The predetermined value is set to 10 km/h, for example, in this embodiment.

The command data for the intervehicular distance L, i.e., the target intervehicular distance data, thus generated are supplied to the intervehicular calculator 40, which determines a deviation of the command data for the intervehicular distance from the predicted intervehicular distance.

The intervehicular distance data, i.e., the deviation of the target intervehicular distance from the predicted intervehicular distance, thus calculated by the intervehicular calculator 40, and the intervehicular speed difference data are supplied to a converter 33 which functions as the intervehicular control acceleration/deceleration data calculating means. The converter 33 generates acceleration/deceleration correcting data by multiplying the intervehicular distance data and the intervehicular speed difference data respectively by predetermined gains Kx1, Ku1 and adding the product values to each other, and outputs the generated acceleration/deceleration correcting data to the comparator 27 in the vehicle speed controller 4.

The comparator 27 compares the acceleration/deceleration correcting data (outputted from the converter 26) based on a predicted deviation after the T seconds with respect to the speed plan with the acceleration/deceleration correcting data (outputted from the converter 33) based on the predicted intervehicular distance up to and the intervehicular speed difference with the front motor vehicle after the T seconds, alternatively selects one of the acceleration/deceleration correcting data to reduce the forward acceleration of the following motor vehicle so that the following motor vehicle will not get too close to the front motor vehicle, and outputs the selected acceleration/deceleration correcting data to a throttle-side integrator 41 and a brake-side integrator 42.

If there is no other motor vehicle in front of the front motor vehicle, or if any other motor vehicle in front of the front motor vehicle is sufficiently spaced from the front motor vehicle, then the comparator 27 on the front motor vehicle outputs the acceleration/deceleration correcting data (outputted from the converter 26) based on a predicted deviation after the T seconds with respect to the speed plan.

The comparator 27 on the front motor vehicle may output the acceleration/deceleration correcting data outputted from the converter 26. The comparator 27 on the following motor vehicle may output the acceleration/deceleration correcting data outputted from the converter 33.

When supplied with the acceleration/deceleration correcting data, the integrators 41, 42 integrate the acceleration/deceleration correcting data and output respective integrated values (corresponding to a target vehicle speed) to a throttle control quantity converter 34 and a brake control quantity converter 35, respectively.

The throttle control quantity converter 34 is supplied with data of the present speed of the motor vehicle, the rotational speed of an engine (not shown), and the gear position of a transmission (not shown) in addition to the output data from the integrator 41. The throttle control quantity converter 34 determines an indicated throttle opening using a predetermined map or the like from the supplied data. The indicated throttle opening is given to a throttle controller 36, which supplies an indicated duty cycle that determines the control quantity for the actuator 15 thereby to control the actuator 15.

The brake control quantity converter 35 is supplied with data of the present speed of the motor vehicle in addition to the output data from the integrator 42. The brake control quantity converter 35 determines an indicated brake pressure using a predetermined map or the like from the supplied data. The indicated brake pressure is given to a brake controller 37, which supplies an indicated duty cycle that determines the control quantity for the actuator 16 thereby to control the actuator 16.

According to the above control process, the speed of the front motor vehicle is controlled according to the speed plan by the acceleration/deceleration correcting data for the speed plan based on the predicted deviation after the T seconds of the front motor vehicle with respect to the speed plan. The speed of the following motor vehicle is controlled to keep an intervehicular distance according to the command data for the intervehicular distance depending on its own speed Vi(0) or the speed Vi-1(0) of the front motor vehicle by the acceleration/deceleration correcting data based on the predicted intervehicular distance up to and the intervehicular speed difference with the front motor vehicle after the T seconds.

In the lateral (steering) positional control according to the present embodiment, a predicted position to be reached by the motor vehicle after a predetermined time and a positional deviation and a directional deviation from a target position to be reached on the running path B are determined based on the lateral positional deviation and directional deviation (angular deviation) from the running path B at the present position of the motor vehicle, which are obtained based on output signals from the front and rear magnetic sensors 6, and also based on the curvature information of the road ahead of the motor vehicle, which is obtained from the LCX cable D, and a steering quantity of the motor vehicle is determined to steer the motor vehicle along the running path B.

In the automatically driven motor vehicle according to the above embodiment, if running as the following motor vehicle, the command data for the intervehicular distance, i.e., the target intervehicular distance data, are generated according to the speed Vi(0) of the following motor vehicle or the speed Vi-1(0) of the front motor vehicle, depending on the magnitude of the speed difference ($|Vi(0)-Vi-1(0)|$) between the speed of the following motor vehicle and the speed of the front following motor vehicle. Therefore, the motor vehicle is prevented from getting too close to the front motor vehicle when the front motor vehicle is decelerated to a stop, and can follow the front motor vehicle while maintaining an appropriate intervehicular distance up to the front motor vehicle.

Specifically, when the front motor vehicle starts to move and is accelerated from stopped conditions of the following motor vehicle and the front motor vehicle and the speed difference ($|Vi(0)-Vi-1(0)|$) between the speed of the following motor vehicle and the speed of the front motor vehicle, increases, the command data for the intervehicular distance are generated according to the speed Vi(0) of the following motor vehicle. Immediately after the front motor vehicle starts to move and is accelerated, since the speed Vi(0) is low, and hence the command data for the intervehicular distance are small. Therefore, the following motor vehicle behind the front motor vehicle is started and accelerated to adjust the intervehicular distance therebetween to a small value depending on the speed Vi(0) which is low. Consequently, the motor vehicle behind the front following motor vehicle smoothly follows the front motor vehicle.

As the speed difference ($|Vi(0)-Vi-1(0)|$) decreases when the following motor vehicle behind the front motor vehicle is accelerated until the front and following motor vehicles run substantially the same speed under steady conditions, the command data for the intervehicular distance are generated according to the speed Vi-1(0) of the front motor vehicle. Therefore, if the front motor vehicle is running at a constant speed or changes its speed gradually, the following motor vehicle can smoothly follow the front motor vehicle while maintaining an appropriate intervehicular distance depending on the speed Vi-1(0) of the front motor vehicle.

While the following motor vehicle is running, if the front motor vehicle is abruptly decelerated based on traffic jam or accident information received from the LCX cable D by the front motor vehicle, or a motor vehicle which happens to be stopping due to a traffic jam or a breakdown is recognized as the front motor vehicle, then since the speed difference (|Vi(0)−Vi-1(0)|) between the speed of the following motor vehicle and the speed of the front motor vehicle is increased, the command data for the intervehicular distance are generated according to the speed Vi(0) of the following front motor vehicle. Inasmuch as the speed Vi(0) is still high at this time, the command data for the intervehicular distance are also large, and the following motor vehicle is decelerated to adjust the intervehicular distance up to the front motor vehicle to a relatively long intervehicular distance depending on the high speed Vi(0). Thus, the following motor vehicle is decelerated at a large deceleration rate, and is prevented from getting too close quickly to the front motor vehicle.

In the automatically driven motor vehicle according the above embodiment, since the acceleration/deceleration correcting data for intervehicular control are generated depending on the deviation between the predicted intervehicular distance after the T seconds and the command data for the intervehicular distance, a future intervehicular distance is controlled according to the command data. Therefore, the following motor vehicle is reliably and smoothly operated to follow the front motor vehicle while maintaining a suitable intervehicular distance up to the front following motor vehicle without suffering a delay in the control of the acceleration/deceleration.

Furthermore, inasmuch as the acceleration/deceleration correcting data are generated depending on not only the deviation between the predicted intervehicular distance and the command data for the intervehicular distance, but also the predicted intervehicular speed difference after the T seconds, to control the following motor vehicle, if the intervehicular speed difference becomes large due to acceleration or deceleration of the front motor vehicle, then the following motor vehicle is also accelerated or decelerated to a relatively large degree depending on the acceleration or deceleration of the front motor vehicle. Consequently, the following motor vehicle can be accelerated or decelerated quickly depending on the acceleration or deceleration of the front motor vehicle.

Because the front motor vehicle and the following motor vehicle have the same system arrangement, the front motor vehicle and the following motor vehicle can be controlled to be automatically driven in appropriate modes thereof according to respective software details or programs which differ from each other only slightly.

The communication signal processor 1, the control plan processor 2, the lateral (steering) vehicle controller 3, and the vehicle speed controller 4 are constructed as respective modules each comprising a central processing unit (CPU). Therefore, they can process signals highly accurately at high speeds.

In the illustrated embodiment, the wheel pulse sensor 8, the longitudinal acceleration sensor 9, and the laser radar 10 are provided in the event of a failure to detect the magnetic information sources C. However, the wheel pulse sensor 8, the longitudinal acceleration sensor 9, and the laser radar 10 may be dispensed with, and the position where the motor vehicle runs, i.e., the distance which the motor vehicle has traveled, may be recognized by the number of times that the magnetic information sources C are detected, and the recognized position may be subjected to first- and second-order differentiation to recognize the speed and acceleration of the motor vehicle.

The speed of the front motor vehicle and the distance up to the front motor vehicle may be detected by a radar or image processing on image data generated by a CCD camera.

While in the above embodiment the motor vehicles are automatically run along the running path B while detecting the magnetic information sources C, the present invention is also applicable to a motor vehicle which is automatically run along the running path B while recognizing the position where the motor vehicle runs by processing an image in front of the motor vehicle which is generated by a CCD camera or the like.

Although a certain preferred embodiment of the present invention has been shown and described in detail, it should be understood that various changes and modifications may be made therein without departing from the scope of the appended claims.

What is claimed is:

1. An automatically driven motor vehicle for automatically following a front motor vehicle while controlling an intervehicular distance up to the front motor vehicle, comprising:

first means for recognizing a speed of the following motor vehicle;

second means for recognizing a speed of the front motor vehicle;

third means for comparing the difference between the speed of the following motor vehicle and the speed of the front motor vehicle with a predetermined value, and adjusting acceleration/deceleration correcting data to adjust an intervehicular distance between the following motor vehicle and the front motor vehicle depending on the speed of the following motor vehicle or the speed of the front motor vehicle based on a result of the comparison, said third means comprising means for generating said acceleration/deceleration correcting data based on the speed of the front motor vehicle if said difference is less than said predetermined value, and generating said acceleration/deceleration correcting data based on the speed of the following motor vehicle if said difference is greater than said predetermined value; and control means for controlling acceleration and deceleration of the following motor vehicle depending on said acceleration/deceleration correcting data.

2. An automatically driven motor vehicle according to claim 1, wherein said third means comprises:

fourth means for recognizing an intervehicular distance between the following motor vehicle and the front motor vehicle;

fifth means for generating command data for an intervehicular distance between the following motor vehicle and the front motor vehicle depending on the speed of the following motor vehicle or the speed of the front motor vehicle based on said result of the comparison, said fifth means comprising means for generating said command data depending on the speed of the front motor vehicle if said difference is less than said predetermined value, and generating command data for an intervehicular distance depending on the speed of the following motor vehicle if said difference is greater than said predetermined value; and sixth means for generating said acceleration/deceleration correcting data depending on a deviation between the recognized intervehicular distance and said command data.

3. An automatically driven motor vehicle according to claim 2, wherein said command data for the intervehicular distance comprise data having a magnitude proportional to the magnitude of the speed of the following motor vehicle or the speed of the front motor vehicle.

4. An automatically driven motor vehicle according to claim 1, further comprising means for generating second acceleration/deceleration correcting data for the following motor vehicle depending on the difference between the speed of the following motor vehicle and the speed of the front motor vehicle, said control means comprising means for controlling the acceleration/deceleration of the following motor vehicle depending on said acceleration/deceleration correcting data and said second acceleration/deceleration correcting data.

5. An automatically driven motor vehicle according to claim 1, further comprising:

intervehicular communication means for transmitting and receiving information indicative of speeds of the following motor vehicle and the front motor vehicle between at least the following motor vehicle and the front motor vehicle;

said second means comprising means for recognizing the speed of the front motor vehicle based on the information received from the front motor vehicle by said intervehicular communication means.

6. An automatically driven motor vehicle for automatically following a front motor vehicle while controlling an intervehicular distance up to the front motor vehicle, comprising:

first means for recognizing present running states of the following motor vehicle which include at least a speed and an acceleration thereof;

second means for recognizing present running states of the front motor vehicle which include at least a position of the front motor vehicle with respect to the following motor vehicle, a speed of the front motor vehicle, and an acceleration of the front motor vehicle;

third means for determining a predicted intervehicular distance between the following motor vehicle and the front motor vehicle after a predetermined time based on the present running states of the following motor vehicle and the present running states of the front motor vehicle;

fourth means for comparing the difference between the speed of the following motor vehicle and the speed of the front motor vehicle with a predetermined value, and generating command data for an intervehicular distance between the following motor vehicle and the front motor vehicle depending on the speed of the following motor vehicle or the speed of the front motor vehicle based on a result of the comparison, said fourth means comprising means for generating said command data based on the speed of the front motor vehicle if said difference is less than said predetermined value, and generating said command data based on the speed of the following motor vehicle if said difference is greater than said predetermined value;

fifth means for generating acceleration/deceleration correcting data for the following motor vehicle depending on a deviation between said predicted intervehicular distance and said command data for the intervehicular distance; and control means for controlling acceleration and deceleration of the following motor vehicle depending on said acceleration/deceleration correcting data.

7. An automatically driven motor vehicle according to claim 6, wherein said command data for the intervehicular distance comprise data having a magnitude proportional to the magnitude of the speed of the following motor vehicle or the speed of the front motor vehicle.

8. An automatically driven motor vehicle according to claim 6, further comprising:

means for determining a predicted intervehicular speed difference between the following motor vehicle and the front motor vehicle after the predetermined time based on the present running states of the following motor vehicle and the present running states of the front motor vehicle; and means for generating second acceleration/deceleration correcting data for the following motor vehicle depending on said predicted intervehicular speed difference;

said control means comprising means for controlling acceleration and deceleration of the following motor vehicle depending on said acceleration/deceleration correcting data and said second acceleration/deceleration correcting data.

9. An automatically driven motor vehicle according to claim 6, further comprising:

intervehicular communication means for transmitting and receiving information indicative of said running states of the following motor vehicle and the front motor vehicle between at least the following motor vehicle and the front motor vehicle;

said second means comprising means for recognizing the running states of the front motor vehicle based on the information received from the front motor vehicle by said intervehicular communication means.

10. An automatically driven motor vehicle for automatically following a front motor vehicle while controlling an intervehicular distance up to the front motor vehicle, comprising:

a control plan processor;

a vehicle speed controller that generates an acceleration command in response to acceleration/deceleration correcting data generated by said control plan processor;

a throttle actuator controlled by said vehicle speed controller; and a brake actuator controlled by said vehicle speed controller;

wherein said control plan processor compares the difference between the speed of the following motor vehicle and the speed of the front motor vehicle with a predetermined value, and generates said acceleration/deceleration correcting data based on the speed of the front motor vehicle if said difference is less than said predetermined value, and generates said acceleration/deceleration correcting data based on the speed of the following motor vehicle if said difference is greater than said predetermined value.

11. An automatically driven motor vehicle according to claim 10, further comprising:

a communications signal processor for transmitting and receiving information indicative of speeds of the following motor vehicle and the front motor vehicle between at least the following motor vehicle and the front motor vehicle.

* * * * *

UNITED STATES PATENT AND TRADEMARK OFFICE
CERTIFICATE OF CORRECTION

PATENT NO. : 5,899,289
DATED : May 4, 1999
INVENTOR(S) : Isao Uematsu

It is certified that error appears in the above-identified patent and that said Letters Patent is hereby corrected as shown below:

Column 1, line 52, please change "v" to -- V --.

Column 3, line 61, please delete "motor vehicle" (first occurrence).

Column 5, line 43, please change "motor vehicle following" to – following motor vehicle --.

Column 11, lines 49- 50, please change "following vehicle" to – following motor vehicle --.

Column 16, line39, please delete "following".

Column 16, lines 39-40, after "Therefore, the" please insert – following --.

Column 16, line 46, please change "vehicle and" (second occurrence) to – vehicle, and --.

Column 17, line 30, please change "control of the" to – control of its own --.

Signed and Sealed this

Twenty-ninth Day of February, 2000

Attest:

Q. TODD DICKINSON

*Attesting Officer*  *Commissioner of Patents and Trademarks*